United States Patent
Diefenderfer

(10) Patent No.: US 8,250,770 B2
(45) Date of Patent: Aug. 28, 2012

(54) PULLEY ALIGNMENT SYSTEM

(75) Inventor: Randall R. Diefenderfer, Greene, MO (US)

(73) Assignee: Dayco Products, LLC, Tulsa, OK (US)

( * ) Notice: Subject to any disclaimer, the term of this patent is extended or adjusted under 35 U.S.C. 154(b) by 0 days.

(21) Appl. No.: 12/604,037

(22) Filed: Oct. 22, 2009

(65) Prior Publication Data

US 2011/0094116 A1   Apr. 28, 2011

(51) Int. Cl.
*G01B 11/27* (2006.01)

(52) U.S. Cl. .................................. 33/286; 33/DIG. 21

(58) Field of Classification Search .................. 33/286, 33/DIG. 1, DIG. 21, 412, 529
See application file for complete search history.

(56) References Cited

U.S. PATENT DOCUMENTS

| | | | |
|---|---|---|---|
| 4,249,294 A | 2/1981 | Belfiore | |
| 5,392,550 A | 2/1995 | Moore et al. | |
| 5,821,852 A | 10/1998 | Fairchild | |
| 5,987,762 A | 11/1999 | Toth et al. | |
| 6,031,616 A | 2/2000 | Seiffert | |
| 6,098,297 A * | 8/2000 | Belfiore | 33/286 |
| 6,173,502 B1 * | 1/2001 | Scarborough | 33/371 |
| 6,332,276 B1 * | 12/2001 | Mangel | 33/286 |
| 6,374,507 B1 * | 4/2002 | Lehto | 33/645 |
| 6,434,841 B1 | 8/2002 | Stahl et al. | |
| 6,568,095 B2 * | 5/2003 | Snyder | 33/370 |
| 6,704,115 B1 | 3/2004 | Hamar | |
| 6,804,897 B1 * | 10/2004 | Horn | 33/606 |
| 6,825,923 B2 | 11/2004 | Hamar et al. | |
| 6,889,441 B2 * | 5/2005 | Seiffert | 33/286 |
| 6,968,625 B2 * | 11/2005 | Segerstrom et al. | 33/286 |
| 7,467,474 B1 * | 12/2008 | Statham | 33/286 |
| 7,845,084 B2 * | 12/2010 | Statham | 33/286 |
| 2007/0271800 A1 * | 11/2007 | Hersey et al. | 33/286 |
| 2008/0276473 A1 * | 11/2008 | Raschella et al. | 33/286 |

OTHER PUBLICATIONS

PCT, International Search Report and Written Opinion, International Application No. PCT/US2010/052455 (Dec. 8, 2010).

* cited by examiner

*Primary Examiner* — Christopher Fulton

(74) *Attorney, Agent, or Firm* — Thompson Hine LLP

(57) ABSTRACT

A pulley alignment apparatus including an elongated body having a mounting surface, two elongated legs extending outward from the mounting surface, each of the legs terminating at a tip, a laser supported by the body, wherein the laser is configured to project a planar beam, a power supply for supplying electrical power to the laser, a normally-open switch configured to detect contact between the body and a pulley, wherein the switch electrically couples the laser with the power supply when the contact is detected, and a magnet supported by the body proximate the mounting surface.

21 Claims, 5 Drawing Sheets

PULLEY ALIGNMENT SYSTEM

FIELD

The present patent application relates to pulley alignment apparatus, systems and methods and, more particularly, to apparatus, systems and methods for aligning pulleys in a belt and pulley system.

BACKGROUND

A belt and pulley system typically includes a belt and at least two pulleys, wherein each pulley is rotatable about an associated rotational axis. The belt is engaged with both pulleys, thereby transferring rotational power from one pulley to the other. For example, in an automotive application, rotational power from the crankshaft may be transferred to various systems, such as the power steering system, the alternator and the air conditioning compressor, by way of a belt and pulley system.

Misalignment of pulleys in a belt and pulley system has been known to result in increased system noise, excessive belt wear, unnecessary loads on the pulleys, and unintentional displacement of the belt during operation. Pulley misalignment occurs when one or more pulleys in the belt and pulley system is axially and/or angularly displaced from the other pulleys in the system. In the automotive application, misalignment occurs when one or more pulleys is axially and/or angularly displaced from the pulley associated with the crankshaft.

Accordingly, those skilled in the art continue to seek techniques for quickly and accurately gauging the alignment of the pulleys in a belt and pulley system.

SUMMARY

In one aspect, the disclosed pulley alignment apparatus may include an elongated body having a mounting surface, two elongated legs extending outward from the mounting surface, each of the legs terminating at a tip, a laser supported by the body, wherein the laser is configured to project a planar beam, a power supply for supplying electrical power to the laser, a normally-open switch configured to detect contact between the body and a pulley, wherein the switch electrically couples the laser with the power supply when the contact is detected, and a magnet supported by the body proximate the mounting surface.

In another aspect, the disclosed pulley alignment system may include a target component and a sighting component, wherein the target component includes an elongated body having a mounting surface and an outer surface, wherein the outer surface is marked with indicia that identifies a target, at least two elongated legs extending outward from the mounting surface, and a retaining mechanism supported by the body, the retaining mechanism being disposed proximate the mounting surface, and wherein the sighting component includes an elongated body having a mounting surface, at least two elongated legs extending outward from the mounting surface, a laser supported by the body, wherein the laser is configured to project at least two points onto the target component, a power supply for supplying electrical power to the laser, a normally-open switch configured to detect contact between the body and a pulley, wherein the switch electrically couples the laser with the power supply when contact is detected, and a retaining mechanism supported by the body, the retaining mechanism being disposed proximate the mounting surface.

In another aspect, the disclosed method for detecting misalignment of a first pulley relative to a second pulley may include the steps of (1) mounting a target component of a pulley alignment system onto the first pulley, the target component including indicia that indentifies a target on the target component, (2) mounting a sighting component of a pulley alignment system onto the second pulley, the sighting component including a laser that projects at least two points onto the target component, wherein the laser is actuated to project the points upon contact between the sighting component and the second pulley, and (3) determining a deviation of the projected points from the target.

Other aspects of the disclosed pulley alignment apparatus, system and method will become apparent from the following description, the accompanying drawings and the appended claims.

DETAILED DESCRIPTION

Figure 1:
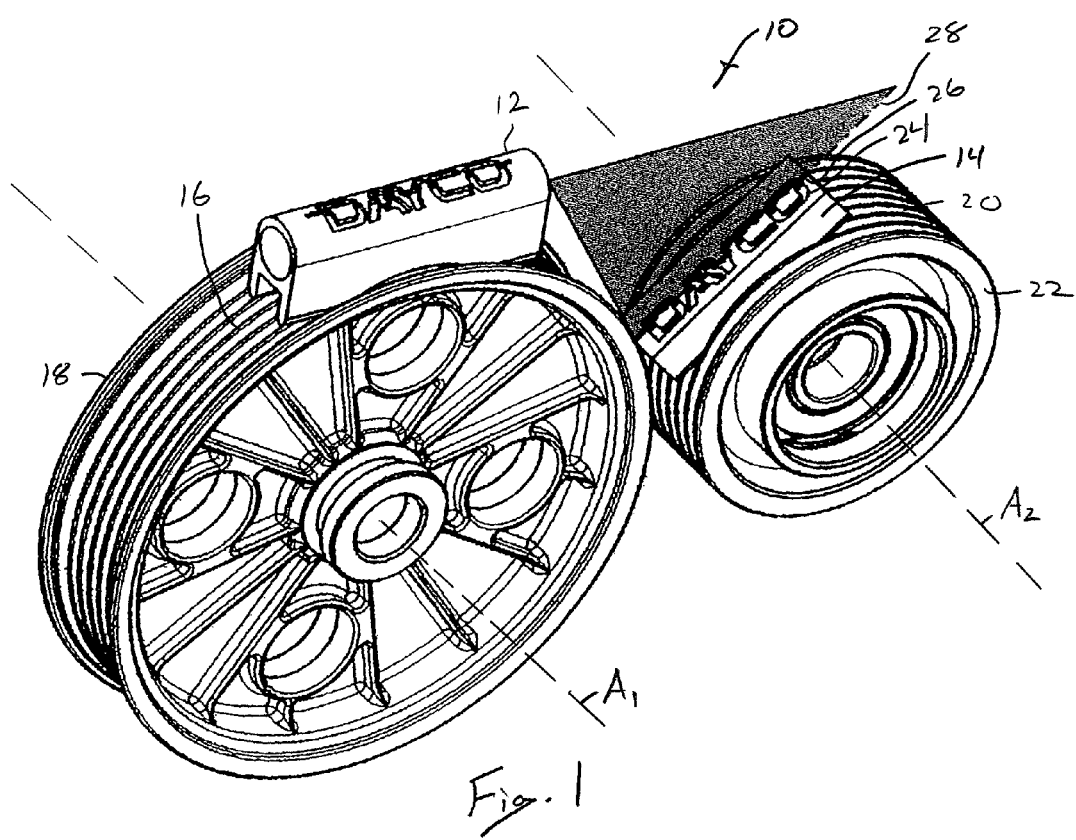
FIG. 1 is a perspective view of one aspect of the disclosed pulley alignment system, which includes a sighting component and a target component.

Referring to FIG. 1, one aspect of the disclosed pulley alignment system, generally designated 10, may include a sighting component 12 and a target component 14. The sighting component 12 may be positioned on a belt engaging surface 16 of a first pulley 18, which may be mounted for rotation about a first rotational axis $A_1$. The target component 14 may be positioned on a belt engaging surface 20 of a second pulley 22, which may be mounted for rotation about a second rotational axis $A_2$. The target component 14 may be provided with indicia 24 that identifies a target 26, such as a line or company logo, on the target component 14. The sighting component 12 may project a beam 28, which may be a single laser point or multiple laser points (e.g., a line), onto the target component 14.

Thus, a user may determine whether the second pulley 22 is axially displaced from the first pulley 18 by examining the beam 28 and determining whether the beam 28 is axially displaced from the target 26. If axial displacement is discovered, the user may either adjust the axial position of the first pulley 18 along rotational axis $A_1$ and/or the axial position of the second pulley 22 along rotational axis $A_2$ until precise alignment of the pulleys 18, 22 is achieved.

Furthermore, a user may determine whether the first and/or second pulleys 18, 22 are pitched at an angle relative to the associated rotational axes $A_1$, $A_2$ by projecting the beam 28 as a laser line and examining the laser line 28 and determining whether the laser line 28 is parallel with the target 26 or disposed at an angle relative to the target 26. For example, when the target 26 is a line and when one of the pulleys 18, 22 is not perpendicular to the associated rotational axis $A_1$, $A_2$, the laser line 28 may intersect the target line 26 to define an angle therebetween.

Figure 2:
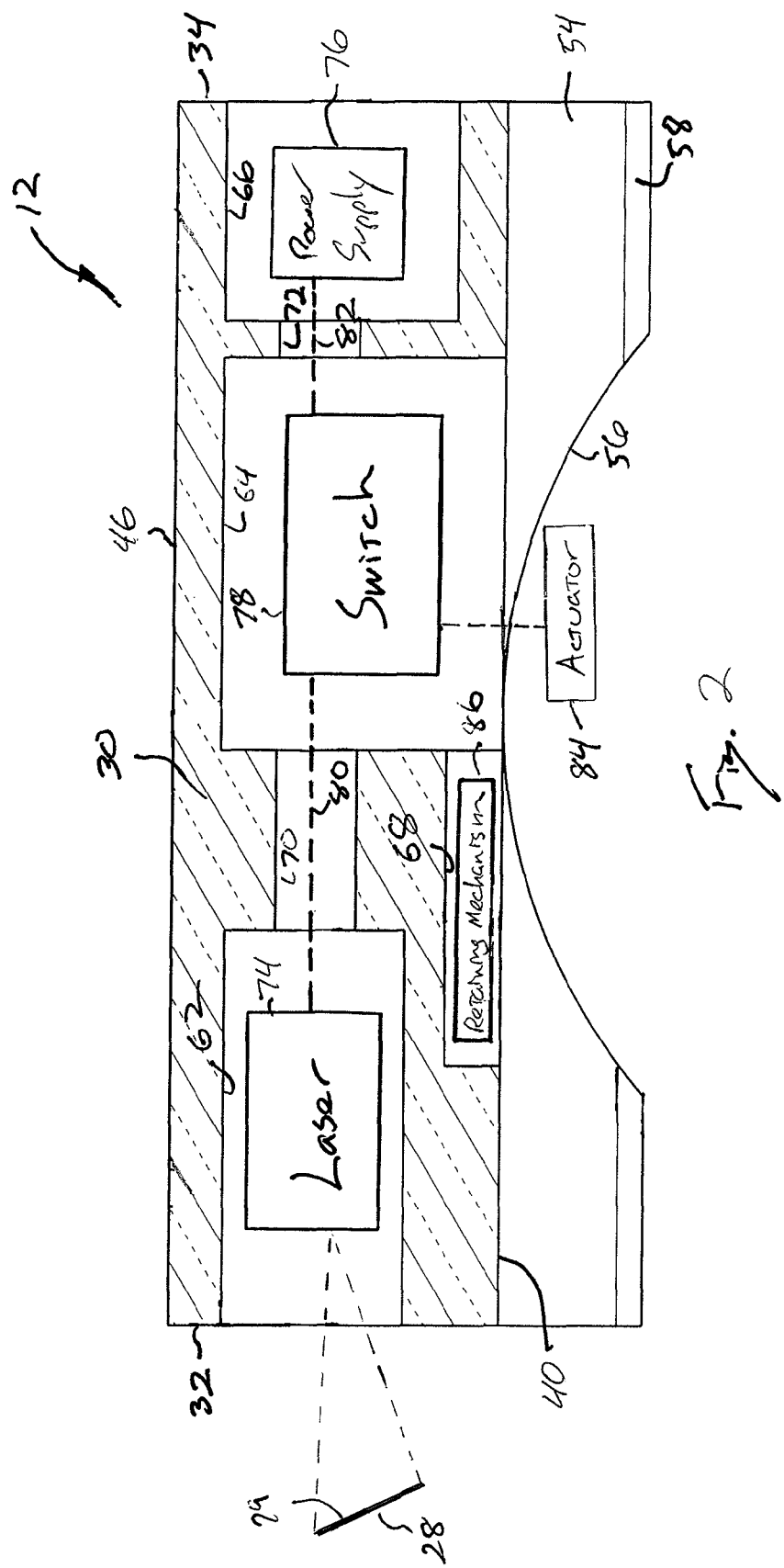
FIG. 2 is a side elevational view, in section, of the sighting component of the pulley alignment system of FIG. 1.
Figure 3:
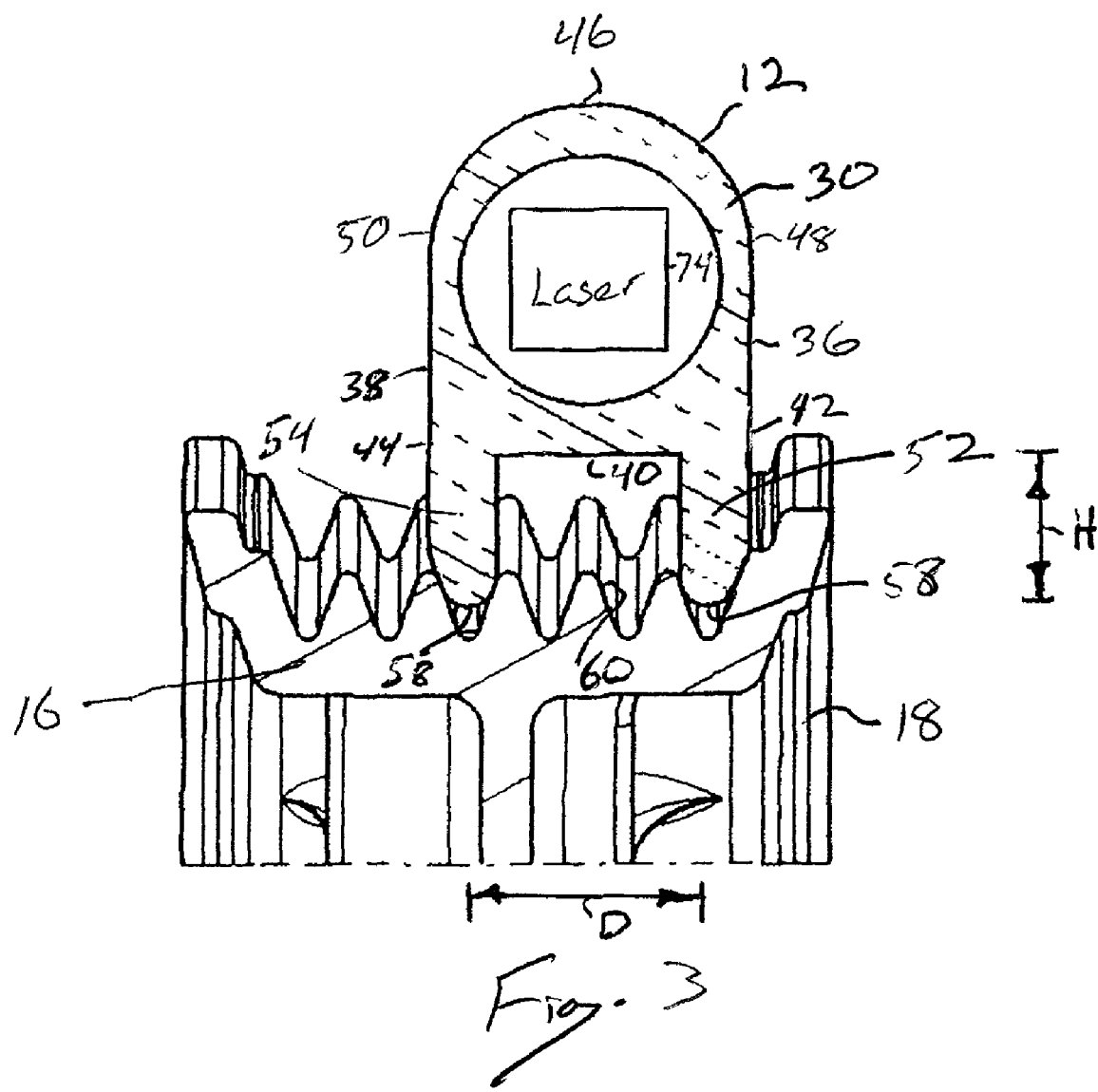
FIG. 3 is an end elevational view, in section, of the sighting component of the pulley alignment system of FIG. 1.

Referring to FIGS. 2 and 3, the sighting component 12 of the pulley alignment system 10 may include an elongated body 30 having a leading end 32, a trailing end 34, side walls 36, 38, a mounting surface 40 extending between first ends 42, 44 of the side walls 36, 38 and an outer surface 46 extending between second ends 48, 50 of the side walls 36, 38. A pair of legs 52, 54 may extend outward from, and generally perpendicular to, the mounting surface 40.

As shown in FIG. 2, the legs 52, 54 may be generally parallel to each other, may extend all or a substantial portion of the length of the body 30, and may define an arch 56 therein. The arch 56 in each leg 52, 54 may be centered relative to the body 30, and may be sized and shaped to correspond to the contour of the associated pulley 18, as shown in FIG. 1.

As shown in FIG. 3, each leg 52, 54 may terminate at a rounded tip 58. The rounded tip 58 may be sized and shaped to be received between the ribs 60 of a pulley 18. For example, the rounded tip 58 may have a diameter of about 2.5 millimeters to correspond with the ribs 60 of a pulley 18 manufactured in accordance with SAE standard J1459.

Furthermore, the legs 52, 54 may be spaced apart from each other by a distance D, which may be measured as the distance from the tip 58 of leg 52 to the tip of leg 54, and may have a height H, which may be measured from the mating surface 40 of the body 30 to the tip 58 of each leg 52, 54. In one aspect, the distance D may be a multiple of 3.56 millimeters (e.g., D=N×3.56 millimeters, wherein N is a whole number greater than 1) such that the sighting component may be mounted on a pulley 18 manufactured in accordance with SAE standard J1459, which specifies a nominal rib pitch of 3.56 millimeters. In one specific example, the distance D may be about 10.68 millimeters.

Referring back to FIG. 2, the body 30 may be a solid body and may define a laser compartment 62, a switch compartment 64, a battery compartment 66 and a magnet compartment 68 therein. A first channel 70 may provide communication between the laser and the switch compartments 62, 64 and a second channel 72 may provide communication between the switch and the battery compartments 64, 66. The laser compartment 62 may be recessed into the body 30 from the leading end 32 of the body 30. The battery compartment 66 may be accessed through the trailing end 34 of the body 30. The magnet compartment 68 may be recessed into the body 30 from the mounting surface 40 of the body 30.

A laser 74 may be received in the laser compartment 62 and may project the beam 28 outward from the leading end 32 of the body 30. The laser 74 may be any device capable of projecting the beam 28 onto the target component 14. In one aspect, as shown in FIGS. 1 and 2, the beam 28 may be a planar beam and may be projected on the target component 14 as a line 29 through a generally vertical plane, thereby limiting or eliminating the problems associated with laser beam diffraction due to the rounded tips and angular flank of the ribs 60 of the pulley 18. In another aspect, the beam 28 may be projected on the target component 14 as a single point (not shown) or multiple points, which may or may not be in a line. For example, the laser 74 may be the LASIRIS™ reduced speckle line generator available from StockerYale, Inc. of Salem, N.H. As another example, the laser 74 may be a 650 nm, 5 mW red laser line module available from Instapark.

The laser 74 may be electrically powered by a power supply 76 received in the battery compartment 66. The power supply 76 may be any appropriate source of electrical energy. In one exemplary aspect, the power supply 76 may be a battery, such as a disposable or rechargeable battery (e.g., an AA battery).

A switch 78 may be received in the switch compartment 64 and may selectively electrically couple the laser 74 to the power supply 76. Electrical lines 80, 82 may extend through the channels 70, 72 to electrically couple the laser 74 to the switch 78 and the switch 78 to the power supply 76.

The switch 78 may be a normally open, push-to-make-contact switch, and may include an actuator 84 disposed proximate the mounting surface 40 and configured to detect the presence of the pulley 18 and, when the pulley 18 is detected, close the switch 78 to power the laser 74. In one particular aspect, actuator 84 may be a spring-loaded plunger or finger that is displaced by engagement with the pulley 18 when the sighting component 12 is mounted on the pulley 18. For example, the switch 78 may be a submini SPDT level switch available from Radio Shack.

A retaining mechanism 86 may be received in the magnet compartment 68 proximate the mounting surface 40. As used herein in, "proximate" means at or proximate. The retaining mechanism 86 may be securely connected to the body 30 and may assist in retaining the sighting component 12 on the first pulley 18. Therefore, the retaining mechanism 86 may be a device or material that retains, whether securely or only slightly, the sighting component 12 relative to the pulley 18. In one exemplary aspect, the retaining mechanism 86 may be a magnet. In an alternative aspect, the retaining mechanism 86 may be a tacky adhesive or tape material.

Figure 4:
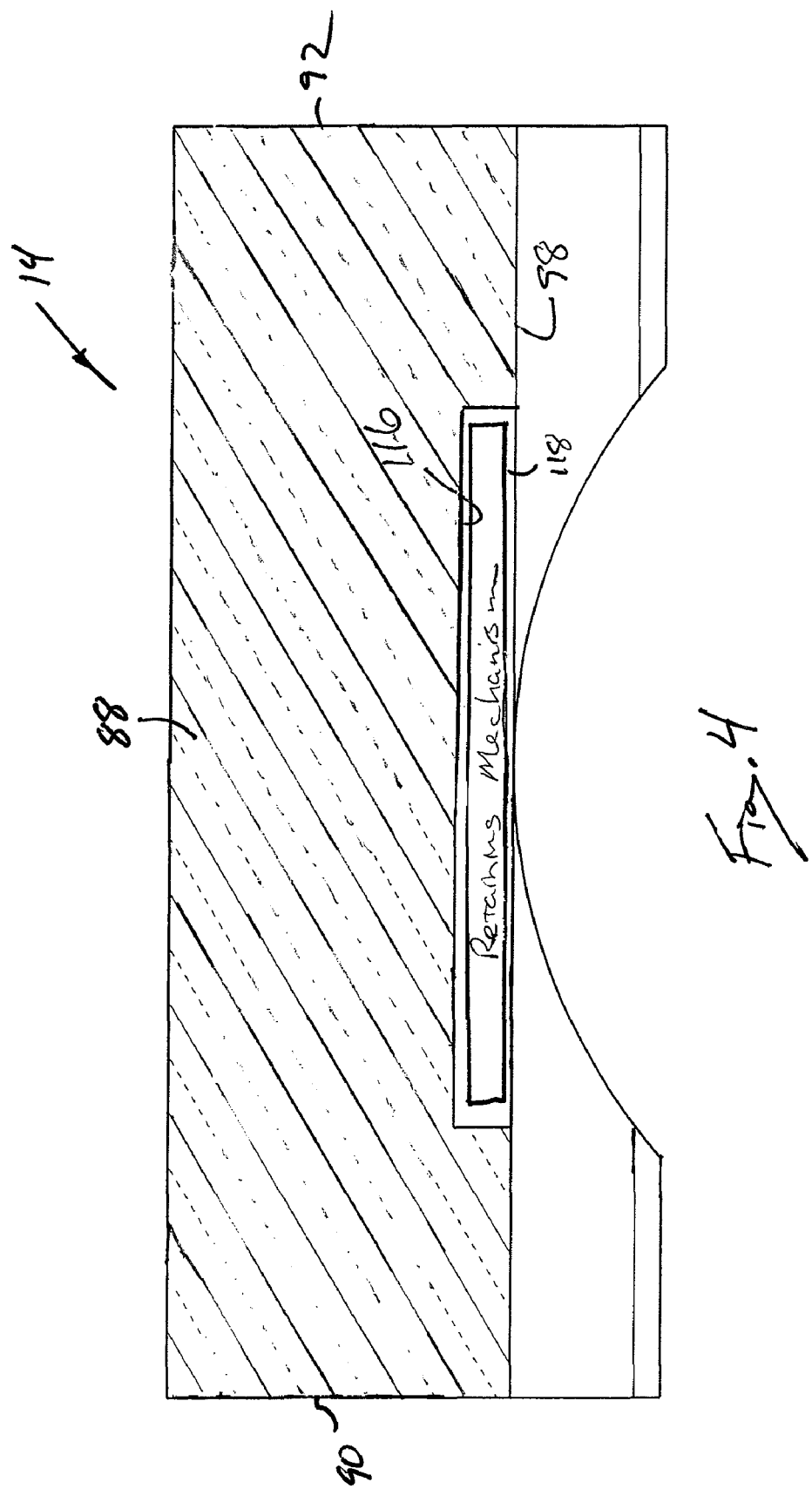
FIG. 4 is a side elevational view, in section, of the target component of the pulley alignment system of FIG. 1.
Figure 5:
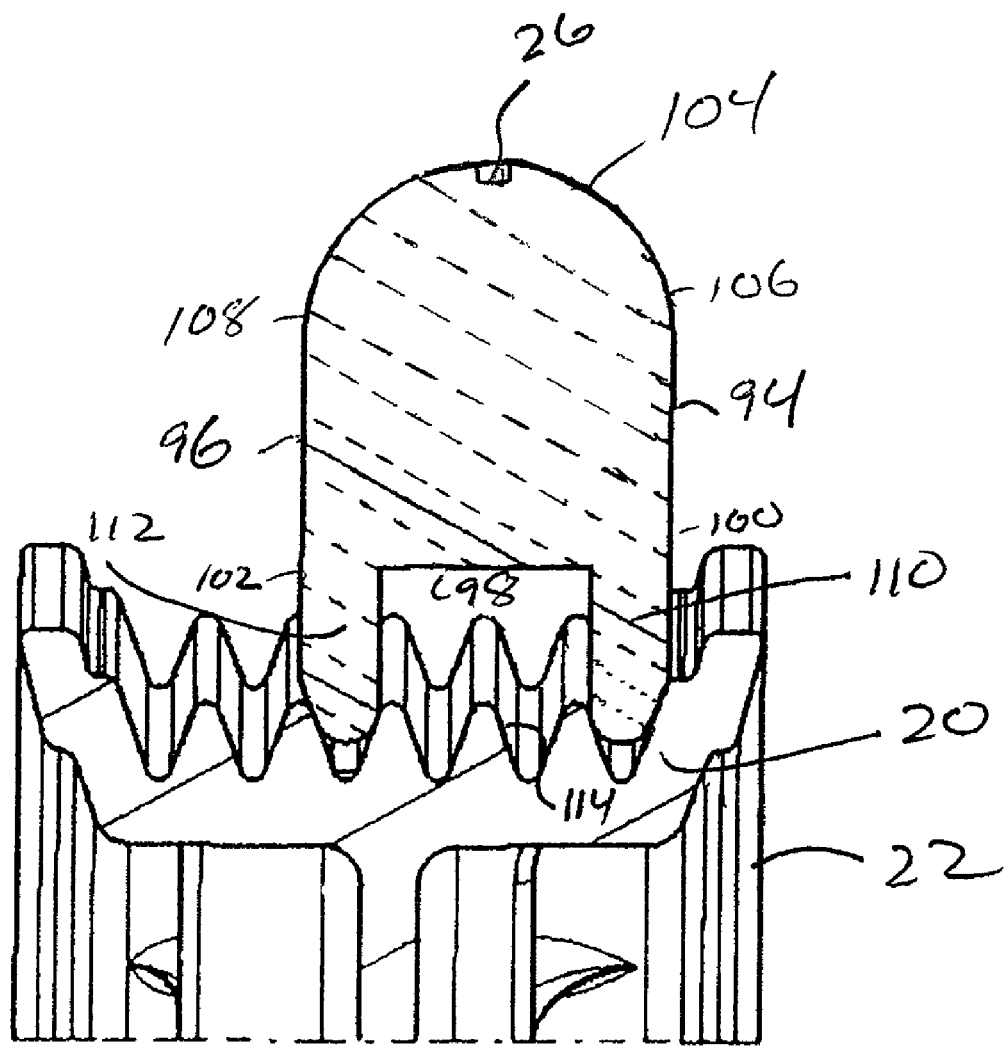
FIG. 5 is an end elevational view, in section, of the target component of the pulley alignment system of FIG. 1.

Referring to FIGS. 4 and 5, the target component 14 of the pulley alignment system 10 may include an elongated body 88 having a first end 90, a second end 92, side walls 94, 96, a mounting surface 98 extending between first ends 100, 102 of the side walls 94, 96 and an outer surface 104 extending between second ends 106, 108 of the side walls 94, 96. A pair of legs 110, 112 may extend outward from, and generally perpendicular to, the mounting surface 98.

The legs 110, 112 of the target component 14 may be constructed to engage the ribs 114 on the belt engaging surface 20 of the second pulley 22. Therefore, the legs 110, 112 of the target component 14 may be sized, shaped and dimensioned in a manner similar to the legs 52, 54 of the sighting component 12.

The body 88 of the target component 14 may be a solid body and may define a magnet compartment 116 therein. The magnet compartment 116 may be recessed into the body 88 from the mounting surface 98 of the body 88. A retaining mechanism 118 may be received in the magnet compartment 68 and securely connected to the body 88 to assist in retaining the target component 14 on the second pulley 22. The retaining mechanism 118 may be a magnet or other device or material that retains, whether securely or only slightly, the target component 14 relative to the second pulley 22, as discussed above in connected with retaining mechanism 86.

As shown in FIGS. 1 and 5 and discussed above, the outer surface 104 of the target component 14 may be provided with indicia 24, such as a company logo, that indentifies a target 26. In one aspect, the target 26 may be a line.

Accordingly, the sighting component 12 of the disclosed pulley alignment system 10 may be mounted on a first pulley 18 and the target component 14 may be mounted on a second pulley 22 such that a beam 28 is automatically projected on the target component 14. Deviation between the projected beam 28 and the target 26 on the target component 14 may provide a user with an indication of whether the first and second pulleys 18, 22 are misaligned.

Although various aspects of the disclosed pulley alignment system have been shown and described, modifications may occur to those skilled in the art upon reading the specification. The present application includes such modifications and is limited only by the scope of the claims.

What is claimed is:

1. A pulley alignment apparatus comprising:
an elongated body having a mounting surface;
at least two elongated legs extending outward from said mounting surface, each of said legs terminating at a tip that has a rounded side and a beveled side and a rounded end therebetween;
a laser supported by said body, wherein said laser is configured to project a planar beam;
a power supply housed in said body for supplying electrical power to said laser;
a normally-open switch having an actuator disposed proximate said mounting surface, the actuator configured to detect contact between said mounting surface and a pulley, wherein said switch closes to electrically couple said laser with said power supply only when said contact is detected; and
a magnet supported by said body proximate said mounting surface.

2. The pulley alignment apparatus of claim 1 wherein said tip has a diameter of about 2.5 millimeters.

3. The pulley alignment apparatus of claim 1 wherein said legs are separated by D millimeters, wherein D is a number obtained by multiplying 3.65 by a whole number greater than 1.

4. The pulley alignment apparatus of claim 1 wherein said power supply includes a battery.

5. A method for detecting misalignment of a first pulley relative to a second pulley using a pulley alignment system comprising a target component and a sighting component, wherein said sighting component is the pulley alignment apparatus of claim 1, said method comprising the steps of:
mounting said target component onto said first pulley, said target component including indicia that indentifies a target on said target component;
mounting said sighting component onto said second pulley such that said laser projects at least two points onto said target component, wherein said laser is actuated to project said points automatically upon contact between said sighting component and said second pulley, wherein said contact actuates an actuator coupled to a normally-open switch to close said normally-open switch to electrically couple said laser to said power supply; and
determining a deviation of said projected points from said target.

6. The method of claim 5 further comprising the step of removing said sighting component from said second pulley after said determining step.

7. The method of claim 6 wherein said projection of said points automatically ceases after said removing step.

8. The method of claim 5 wherein said actuator is a spring loaded actuator.

9. The pulley alignment apparatus of claim 1 wherein said actuator is a spring loaded actuator.

10. A pulley alignment system comprising:
a target component comprising:
an elongated first body having a first mounting surface and an outer surface, wherein said outer surface is marked with indicia that identifies a target on said target component;
at least two elongated legs extending outward from said first mounting surface; and
a first retaining mechanism supported by said first body, said first retaining mechanism being disposed proximate said first mounting surface; and
a sighting component comprising:
an elongated second body having a second mounting surface;
at least two elongated legs extending outward from said second mounting surface, each of said legs terminating at a tip that has a rounded side and a beveled side and a rounded end therebetween;
a laser supported by said second body, wherein said laser is configured to project at least two points onto said target component;
a power supply housed in said body for supplying electrical power to said laser;
a normally-open switch having an actuator disposed proximate said mounting surface, the actuator configured to detect contact between said mounting surface and a pulley, wherein said switch closes to electrically couple said laser with said power supply only when said contact is detected; and
a second retaining mechanism supported by said second body, said second retaining mechanism being disposed proximate said second mounting surface.

11. The pulley alignment system of claim 10 wherein said target is a line.

12. The pulley alignment system of claim 10 wherein said tip has a diameter of about 2.5 millimeters.

13. The pulley alignment system of claim 10 wherein said legs of said target component are separated by D millimeters, wherein D is a number obtained by multiplying 3.65 by a whole number greater than 1.

14. The pulley alignment system of claim 10 wherein said first retaining mechanism includes a magnet.

15. The pulley alignment system of claim 10 wherein said power supply includes a battery.

16. The pulley alignment system of claim 10 wherein said points define a line on said target component.

17. The pulley alignment system of claim 10 wherein said actuator is a spring loaded actuator.

18. A pulley alignment apparatus comprising:
an elongated body having a mounting surface;
two elongated legs extending outward from said mounting surface positioned as the outermost legs on opposite sides of the mounting surface, each of said legs terminating at a tip sized and shaped for seating between adjacent ribs of a pulley, each of said tips having a rounded side and a beveled side and a rounded end therebetween; wherein the two legs are spaced apart from each other by a distance from tip to tip thereof that places the tip of each leg in different grooves of the belt engaging surface of the pulley;
a laser supported by said body, wherein said laser is configured to project a planar beam; and
a power supply housed in said body for supplying electrical power to said laser;
wherein the distance from tip to tip of the two legs is smaller than the distance between to the outermost grooves on opposite sides of the belt engaging surface of the pulley such that the pulley alignment apparatus is capable of placement on the belt engaging surface of the pulley in a plurality of positions across the width of the belt engaging surface.

19. The apparatus of claim 18 wherein the distance from tip to tip of the two legs is a multiple of 3.56 millimeters.

20. The apparatus of claim 19 wherein the tip of each leg is rounded.

21. The apparatus of claim 20 wherein each leg includes a bevel on at least one exterior surface, the bevel positioned adjacent to the rounded tip and angled to match the contour of one side of a rib of the pulley.

* * * * *

UNITED STATES PATENT AND TRADEMARK OFFICE
CERTIFICATE OF CORRECTION

PATENT NO. : 8,250,770 B2  
APPLICATION NO. : 12/604037  
DATED : August 28, 2012  
INVENTOR(S) : Randall R. Diefenderfer Page 1 of 1

It is certified that error appears in the above-identified patent and that said Letters Patent is hereby corrected as shown below:

In the Claims

Column 5, Claim 3, Line 23 reads: "obtained by multiplying 3.65 by a whole number greater than"

It should read -- obtained by multiplying 3.56 by a whole number greater than --

Column 6, Claim 13, Line 24 reads: "wherein D is a number obtained by multiplying 3.65 by a"

It should read -- wherein D is a number obtained by multiplying 3.56 by a --

Signed and Sealed this  
Thirteenth Day of August, 2013

Teresa Stanek Rea  
*Acting Director of the United States Patent and Trademark Office*